United States Patent
Matyas, Jr. et al.

(10) Patent No.: US 6,301,362 B1
(45) Date of Patent: Oct. 9, 2001

(54) METHOD AND APPARATUS FOR CRYPTOGRAPHICALLY TRANSFORMING AN INPUT BLOCK INTO AN OUTPUT BLOCK

(75) Inventors: Stephen M. Matyas, Jr., Manassas, VA (US); Don Coppersmith, Ossining, NY (US); Donald B. Johnson, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/096,615

(22) Filed: Jun. 12, 1998

(51) Int. Cl.$^7$ ....................................... H04L 9/06
(52) U.S. Cl. ................... 380/37; 380/259; 380/29
(58) Field of Search ............................... 380/259, 29, 265, 380/37

(56) References Cited

U.S. PATENT DOCUMENTS 6,185,304 * 2/2001 Coppersmith .......................... 380/37

OTHER PUBLICATIONS

Coppersmith et al, A proposed mode for triple–DES encryption, IBM J. Research & Development, Mar 96, vol. 40, Issue 2, pp. 253–262.*
Schneier, Applied Cryptography, 2nd Edition, Oct. 18, 1995, pp. 319–325.*
FIPS PUB 46–2 Dec. 30, 1993—"Data Encryption Standard (DES)".
FIPS PUB 81—Dec. 2, 1980—DES Modes Of Operation.
Information Processing Letters 41, vol. 41, No.2 —Feb. 14, 1992, "On Immunity Against Biham . . . Cryptanalysis", pp. 77–80.
Fast Software Encryption—Cambridge Security Workshop—Dec. 9–Nov. 1993, "On Modes Of Operation"—Feb. 22, 1994 by E. Biham—pp. 116–120.
USENIX Assoc., Proc. of the Summer '94 USENIX Conf.—Jun.6–Oct. 1994, "Key Management In An Encrypting File System" by M. Blaze, pp. 27–35.
Advances In Cryptology–CRYPTO '90—"The REDOC II Cryptosystem" by T.W. Cusick et al—pp. 545–563.
Fast Software Encryption—Cambridge Security Workshop—Dec.9–Nov. 1993, "A New Approach To Block Cipher Design" by J. Daemen et al, pp. 18–32 .
Fast Software Encryption—Cambridge Security Workshop—Dec. 9–Nov., 1993, "VINO: A Block Cipher . . . Permutations" by A. DiPorto, pp. 205–210.

(List continued on next page.)

Primary Examiner—Gilberto Barron, Jr.
Assistant Examiner—Jeffrey S. Leaning
(74) Attorney, Agent, or Firm—William A. Kinnaman, Jr.

(57) ABSTRACT

A method and apparatus for cryptographically transforming an input block into an output block. The input block has a first block size and is partitionable into a plurality of input subblocks having a second block size that is a submultiple of the first block size. To encrypt or decrypt, the input subblocks are passed through respective first substitution functions controlled by one or more keys to generate a first plurality of modified subblocks. The first plurality of modified subblocks are then passed through a mixing function to generate a second plurality of modified subblocks, each of which depends on each of the first plurality of modified subblocks. Finally, the second plurality of modified subblocks are passed through respective second substitution functions controlled by one or more keys to generate a plurality of output subblocks that are combinable into an output block.

16 Claims, 5 Drawing Sheets

OTHER PUBLICATIONS

Fast Software Encryption—Cambridge Security Workshop—Dec. 9–Nov. 1993, "Fast Block Cipher Proposal" by B.S. Kaliski, Jr. et al, pp. 33–40.

IEICE Trans.Fundamentals, vol. E77–A, No. 8, Aug. 1994, "Dynamic Swapping Schemes . . . Cryptanalysis" by T. Kaneko et al, pp. 1328–1336.

IEICE Trans.Fundamentals, vol. E76–A, No. 1, Jan. 1993, "How To Strengthen DES–like . . . Cryptanalysis" by K.Koyama et al, pp. 63–69.

Fast Software Encryption, Cambridge Security Workshop, Dec. 9–Nov. 1993, "SAFER K–64: A Byte–Oriented . . . Algorithm" by J.Massey,pp. 1–17.

Journal of Cryptology–1995– "Provable Security Against a Differential Attack" by K. Nyberg et al, pp. 27–37.

Dr. Dobb's Journal, Jan. 1995—"The RC5 Encryption Algoithm", by R. L. Rivest, pp. 146 and 148.

Fast Software Encryption, Cambridge Security Workshop, Dec. 9–Nov. 1993, "Performance of Symmetric Ciphers . . . Functions" by M.Roe, pp. 83–89.

Applied Cryptography, Second Edition, 1996, Chapter 19.3 RSA, by B. Schneier, pp. 466–474.

Fast Software Encryption, Cambridge Security Workshop, Dec. 9–Nov. 1993, "Description of a New . . . Cipher (Blowfish)" by B.Schneier,pp. 191–204.

Dr. Dobb's Journal, Apr. 1994–13 "The Blowfish Encryption ALgorithm" by B. Schneier, pp. 38,40,98–99.

Dr. Dobb's Journal, Dec. 1993, "The IDEA Encryption Algorithm" by B. Schneier—pp. 50,52,54,56,105–107.

Advances in Cryptology—CRYPTO '94—Aug. 21–25, 1994, "Pitfalls Designing . . . Abstract)", by J.Seberry et al, pp. 383–396.

* cited by examiner

METHOD AND APPARATUS FOR CRYPTOGRAPHICALLY TRANSFORMING AN INPUT BLOCK INTO AN OUTPUT BLOCK

BACKGROUND OF THE INVENTION

1. Field of the Invention

This invention relates to a method and apparatus for cryptographically transforming an input block into an output block and, more particularly, to a method and apparatus for encrypting or decrypting an input block using a symmetric block encryption procedure.

2. Description of the Related Art

Cryptographic systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories: asymmetric encryption systems and symmetric encryption systems. Asymmetric (or public key) encryption systems use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate privately with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman and described in B. Schneier, *Applied Cryptography* (1996), pages 466–474, incorporated herein by reference.

Symmetric (or private key) encryption systems, on the other hand, use the same secret key for both encrypting and decrypting messages. Although symmetric encryption systems require some secure means for distributing or agreeing upon secret encryption keys, they continue to be preferred for many applications because of their relative computational efficiency.

Perhaps the best-known symmetric encryption system is the Data Encryption Algorithm (DEA), implementing the Data Encryption Standard (DES) as described in the National Institute of Standards and Technology (NIST) publications "Data Encryption Standard (DES)", FIPS PUB 46-2 (1980), and "DES Modes of Operation", FIPS PUB 81 (1988). In the DES system, a 64-bit key is used to transform a plaintext message comprising one or more 64-bit plaintext blocks into a ciphertext message comprising a like number of 64-bit ciphertext blocks, or vice versa. (56 bits of the key are independently specifiable, while the remaining 8 bits provide a parity check.)

As described in the latter FIPS publication, there are several defined modes of DES encryption. In the Electronic Codebook (ECB) mode, each plaintext block is encrypted independently of any other plaintext block. In the Cipher Block Chaining (CBC) mode of operation, on the other hand, each plaintext block is XORed with the previous ciphertext block (or with an initialization vector in the case of the first block) before being encrypted to hide plaintext patterns and thus provide more resistance to certain types of cryptanalytic attacks.

At the time of its initial promulgation, the 56-bit key length and 64-bit block length of DES were thought to provide adequate protection against cryptographic attacks, including key exhaustion attacks based upon systematically testing all possible keys and dictionary attacks based upon building a "dictionary" of corresponding plaintext and ciphertext blocks. However, continued advances in computing speed make such brute-force attacks increasingly more feasible.

The National Institute of Standards and Testing (NIST) has called for a complete replacement of DES, to be deployed sometime in the future. In the meantime, however, there is a significant investment by users in cryptographic hardware and software based on DES. Any replacement cryptosystem that is deployed in the interim would desirably build upon this existing DES infrastructure.

SUMMARY OF THE INVENTION

One object of the present invention is to provide a symmetric-key block encryption system that is compact.

Another object of the present invention is to provide a symmetric-key block encryption system that is highly resistant to cryptographic attacks, including key exhaustion attacks and dictionary attacks.

Another object of the present invention is to provide a symmetric-key block encryption system whose cryptographic strength can be readily evaluated.

Another object of the present invention is to provide a symmetric-key block encryption system that uses independent design components to achieve each of its goals.

Another object of the present invention is to provide a symmetric-key block encryption system that is compatible with existing cryptographic hardware and software.

In general, the present invention uses a non-secret mixing function surrounded by two strong substitution functions. In effect, the substitution functions hide the mixing function so that manipulation of the bits supplied to or generated by the mixing function should be difficult.

More particularly, the present invention contemplates a method and apparatus for cryptographically transforming an input block into an output block. The input block has a first block size and is partitionable into a plurality of input subblocks having a second block size that is a submultiple of the first block size. To encrypt or decrypt, the input subblocks are passed through respective first substitution functions controlled by one or more keys to generate a first plurality of modified subblocks. The first plurality of modified subblocks are then passed through a mixing function to generate a second plurality of modified subblocks, each of which depends on each of the first plurality of modified subblocks. Finally, the second plurality of modified subblocks are passed through respective second substitution functions controlled by one or more keys to generate a plurality of output subblocks that are combinable into an output block.

In a preferred implementation, the input block is a 256-bit block that is partitioned into four 64-bit subblocks that are passed through the respective substitution functions. Each substitution function in the preferred embodiment is realized by four modular arithmetic operations (mod $2^{64}$ addition for encryption, mod $2^{64}$ subtraction for decryption) inter-leaved with three DES operations (single-DES encryption for encryption, single-DES decryption for decryption), using four different DES keys for an effective key length of 224 bits.

The 224-bit effective key length provides a high work factor (e.g., on the order of $2^{224}$) against key exhaustion attacks, while the 256-bit block size protects against dictionary attacks. At the same time, since the preferred implementation uses standard DES operations as functional building blocks, it is able to use existing DES hardware and software.

DESCRIPTION OF THE PREFERRED EMBODIMENTS

Figure 1:
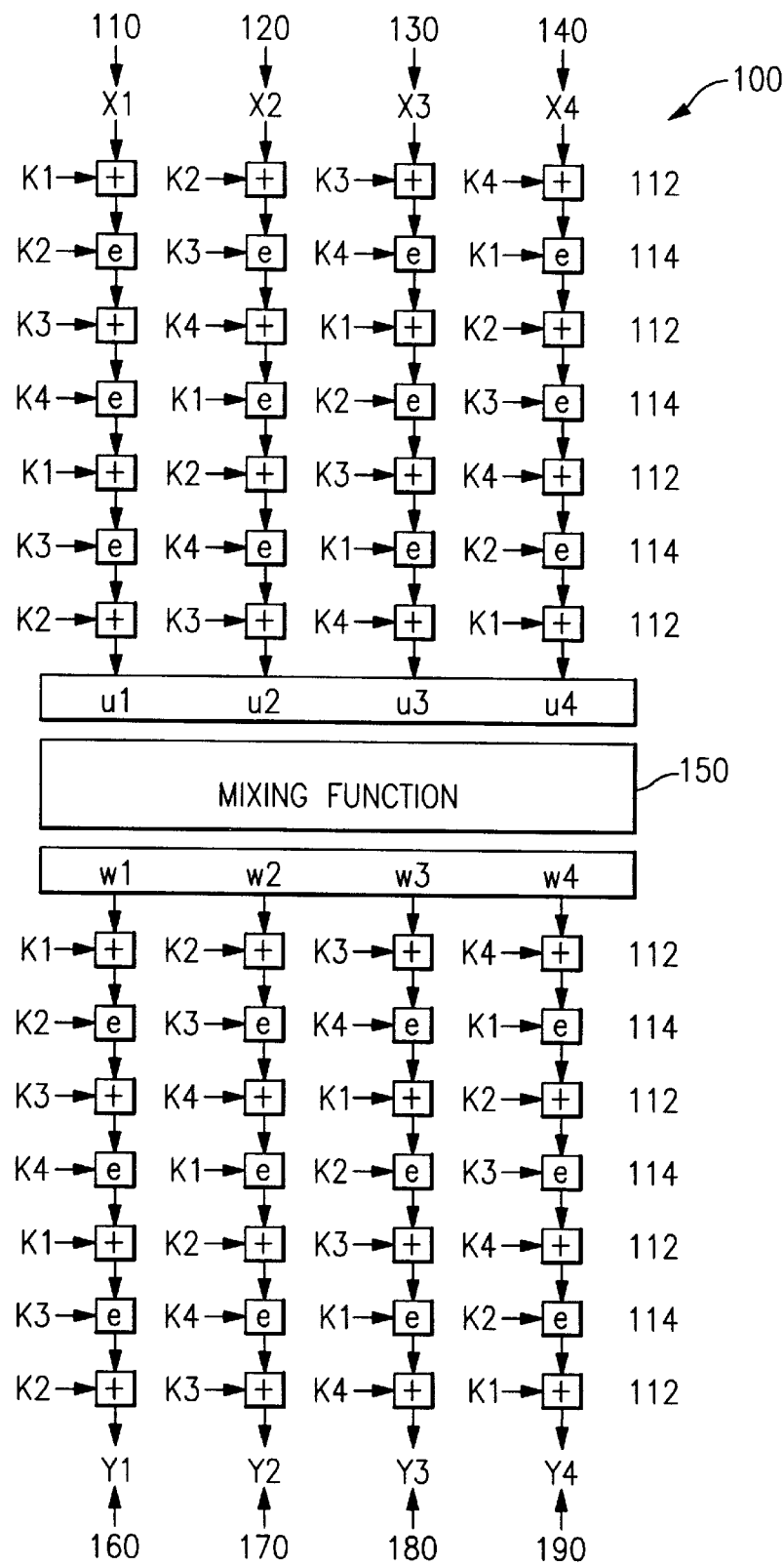
FIG. 1 is a block diagram of an encryption system constructed in accordance with the present invention.

FIG. 1 is a block diagram of an encryption system 100 constructed in accordance with the present invention. Although the invention is not limited to any particular block size, in the embodiment shown, encryption system 100 takes a 256-bit input composed of 64-bit subblocks X1–X4 and transforms it into a similarly sized output block composed of 64-bit subblocks Y1–Y4. Encryption system 100 comprises a first set of keyed substitution functions (or pipes) 110–140, followed by a public mixing function 150, followed in turn by a second set of keyed substitution functions 160–190.

Respective substitution functions 110–140 operate independently of one another to transform input subblocks X1–X4 into a first set of modified subblocks u1–u4. Mixing function 150 "mixes" the first set of subblocks u1–u4 with one another to transform them into a second of modified subblocks w1–w4, with each of the second set of modified subblocks w1–w4 depending on each of the first set of modified subblocks u1–u4. Respective substitution functions 160–190 operate independently of one another to transform the second set of modified subblocks w1–w4 into a set of output subblocks Y1–Y4.

In the embodiment shown, each of the keyed substitution functions 110–140 and 160–190 contains four modular addition operations 112 (denoted by "+") interleaved with three 64-bit (ECB mode) single-DES encryption operations 114 (denoted by "e") using DES keys K1–K4. Thus, substitution function 110 performs an operation 112 of addition mod $2^{64}$ with K1, followed by an operation 114 of single-DES encryption under K2, followed by an operation 112 of addition mod $2^{64}$ with K3, followed by an operation 114 of single-DES encryption under K4, followed by an operation 112 of addition mod $2^{64}$ with K1, followed by an operation 114 of single-DES encryption under K3, followed by a operation 112 of addition mod $2^{64}$ with K2. Substitution functions 120–140 are identical to substitution function 110, except that where an operation in pipe 1 (for X1) uses a key Km, the corresponding operation in pipe i (for Xi) uses key Kn, where n−m≡i−1 (mod 4). Substitution functions 160–190 are identical to substitution functions 110–140, respectively.

Figure 2:
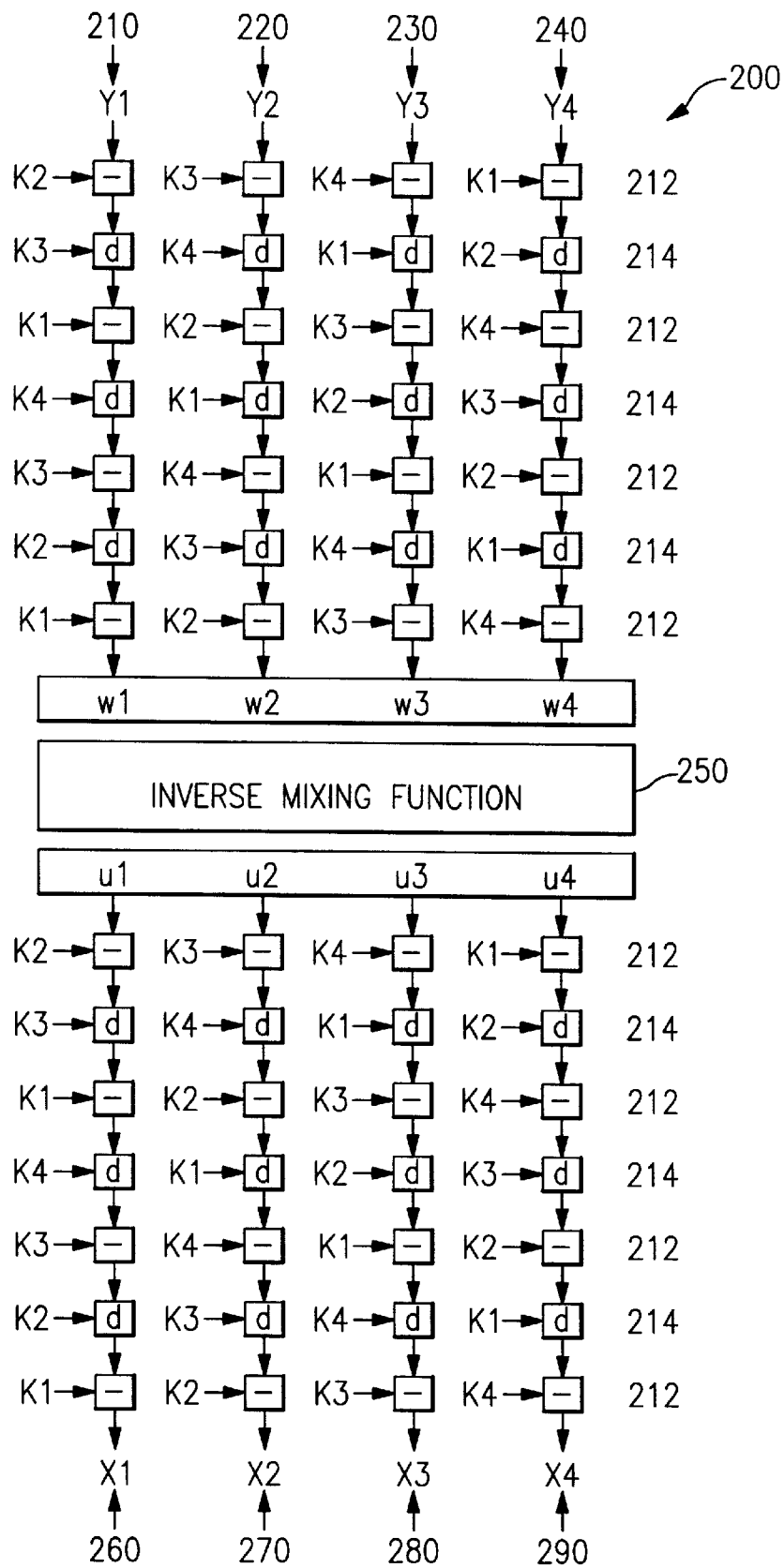
FIG. 2 is a block diagram of a decryption system corresponding to the encryption system of FIG. 1.

FIG. 2 is a block diagram of a decryption system 200 corresponding to the encryption system 100 of FIG. 1. Since decryption is the inverse of encryption, decryption system 200 simply reverses the operations of encryption system 100. Decryption system 200 thus comprises a first set of keyed inverse substitution functions 210–240, followed by an inverse mixing function 250, followed in turn by a second set of keyed inverse substitution functions 260–290. In inverse substitution functions 210–240 and 260–290, the single-DES encryption operations 114 of FIG. 1 are replaced with single-DES decryption operations 214 (denoted by "d" in FIG. 2), and the addition mod $2^{64}$ operations 112 are replaced with subtraction mod $2^{64}$ operations (denoted by "−") in which the key is subtracted from the data. The sequence of keys K1–K4 used in each vertical pipe (e.g., the one containing inverse substitution functions 210 and 260) of the decryption system 200 is the reverse of the sequence used in the corresponding vertical pipe of the encryption system 100. Inverse mixing function 250 is simply the inverse of mixing function 150.

Encryption system 100 and decryption system 200 may be implemented in hardware, in software, or by some combination of the two. An end-to-end communication system would typically contain an encryption system 100 at one node coupled to a decryption system 200 at another node via a communications channel (not shown). Typically, each node of such a communication system would be realized by a personal workstation or the like and contain both an encryption system 100 and a decryption system 200 for sending and receiving encrypted messages.

Figure 3:
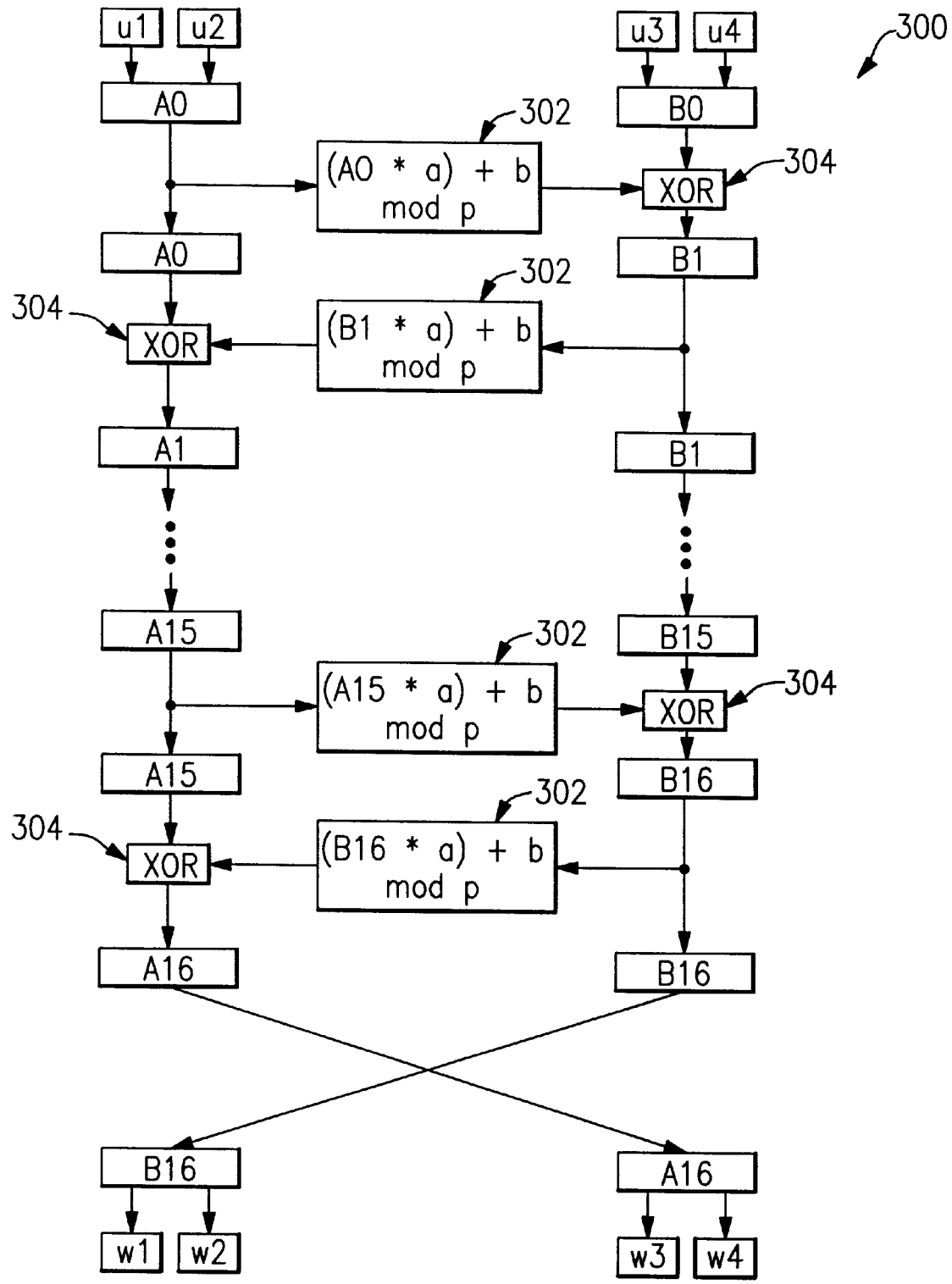
FIG. 3 is a block diagram of one mixing function that may be used as a mixing function in the encryption system of FIG. 1 or as an inverse mixing function in the decryption system of FIG. 2.

Preferably, mixing function 150 comprises a Feistel network that uses multiplication, addition, and modulo operations (i.e., modulo a prime) to implement the round function. FIG. 3 shows one such mixing function 300 that may be used for the mixing function 150 of FIG. 1. As shown in FIG. 3, mixing function 300 consists of 16 rounds of keyless mixing, as follows:

1 Let A0=(u1∥u2) and B0=(u3∥u4), where u1, u2, u3, and u4 are the four 64-bit inputs to the mixing operation.

2 Do i=1to16

3 Compute B[i]=((A[i−1]*a)+b mod p)⊕B[i−1].

4 Calculate A[i]=((B[i]*a)+b mod p)⊕A[i−1].

5 End Do

6 Let w1∥w2=B16 and w3∥w4=A16, where w1, w2, w3, and w4 are the four 64-bit outputs from the mixing operation.

As shown in the figure, and as evident from the above description, in each round a first input half A is passed through a round function 302 of the form $$f(A)=A*a+b \bmod p$$

to produce a result that is combined with a second input half B using an XOR function 304 to generate a second output half B for that round (line 3). The second output half B is then passed through an identical round function 302 of the form $$f(B)=B*a+b \bmod p$$

to produce a result that is combined with the first input half A using an XOR function 304 to generate a first output half A for that round (line 4). (The term "round" is used here to refer to the pair of XOR operations; in the literature, each XOR operation is sometimes considered to belong to a separate "round"). At the end of the last round, the left and right output halves A and B for that round are swapped (line 6).

Mixing function 300 makes use of a single set of parameter values a, b, and p for each mixing round. p is a large prime smaller than $2^{128}$ (for 128-bit halves A and B), a is a generator relatively prime to p (about the size of p), and b is a masking value about the size of p. The values a, b and p are public values, since mixing function 300 is a public function.

The 16 largest primes less than $2^{128}$ are given by the formula $Pi=2^{128}-Si$ where Si=159, 173, 233, 237, 275, 357 675, 713, 797, 1193, 1305, 1407, 1409, 1419, 1479, 1487. In this case, p could be selected as the largest prime less than $2^{128}$, i.e., Si=159 and $p=Pi=2^{128}-159$. Selecting a prime close to but less than $2^{128}$ has the advantage that the output of a mod p operation will be contained in a 128-bit word. However, the invention can be practiced using primes larger than 128 bits, in which case 128 bits of the output of a mod p operation are used (i.e., the least significant 128 bits of the output) and the remainder of the bits in the output are ignored.

It may be readily verified that mixing function 300 is its own inverse. Therefore, the mixing function 300 can be used for the inverse mixing function 250 of FIG. 2 as well as for the mixing function 150 of FIG. 1. When mixing function 300 is used for the inverse mixing function 250, the values w1–w4 in FIG. 2 are the inputs to the mixing operation and u1–u4 are the outputs from the mixing operation.

Figure 4:
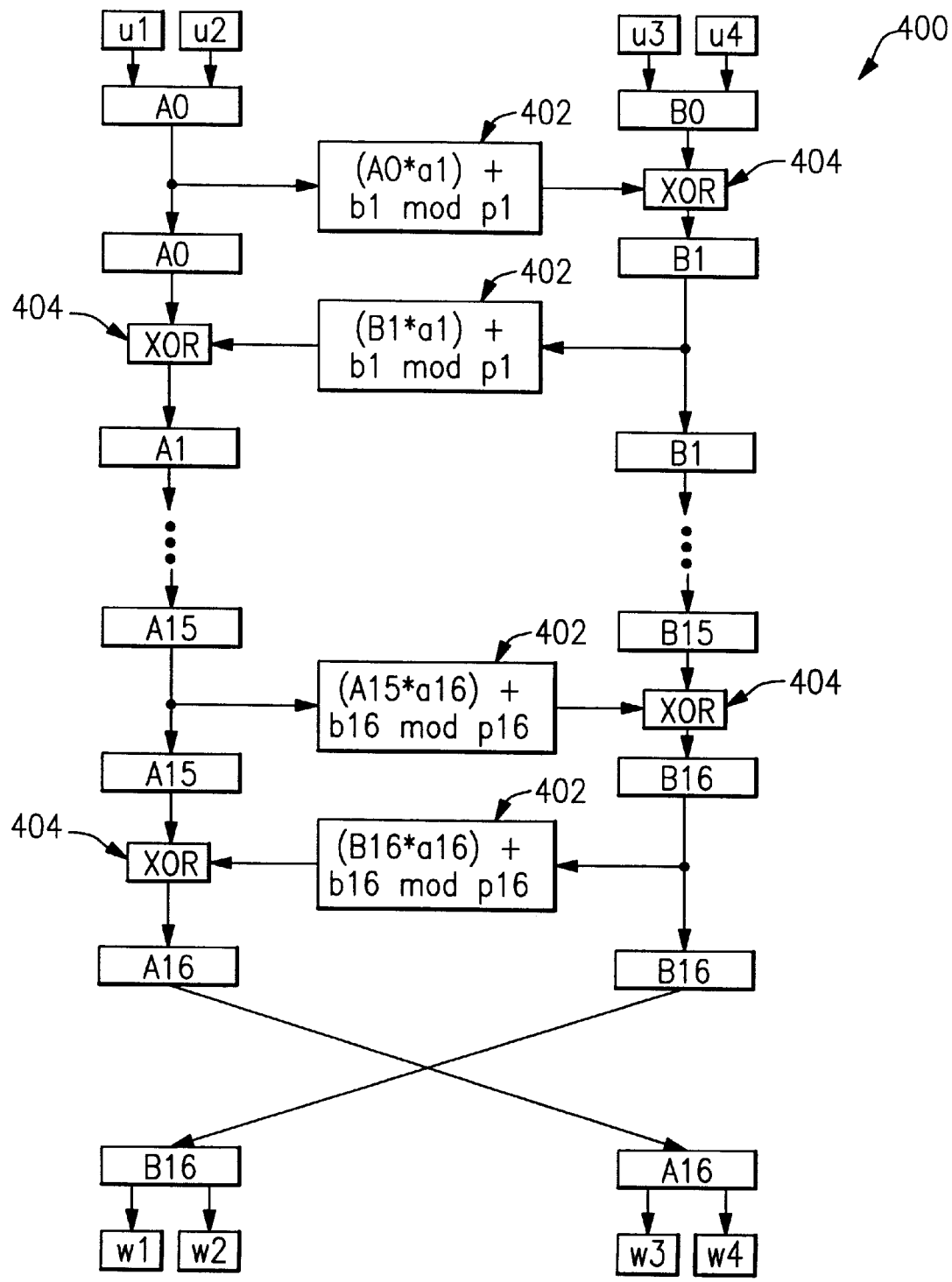
FIG. 4 is a block diagram of an alternative mixing function that may be used in the encryption system of FIG. 1.

FIG. 4 shows an alternative mixing function 400 that may be used instead of mixing function 300 for the mixing function 150 of FIG. 1. Like mixing function 300, mixing function 400 consists of 16 rounds of keyless mixing. However, each round uses a different set of parameters (a[i], b[i], p[i]), so that mixing function 400 makes use of 16 sets of parameter values (a1, b1, p1), . . . , (a16, b16, p16), as follows:

1 Let A0=(u1∥u2) and B0=(u3∥u4), where u1, u2, u3, and u4 are the four 64-bit inputs to the mixing operation.
2 Do i=1 to 16
   3 Compute B[i]=((A[i−1]*a[i])+b[i] mod p[i])⊕ B[i−1].
   4 Calculate A[i]=((B[i]*a[i])+b[i] mod p[i])⊕ A[i−1].
5 End Do
6 Let w1∥w2=B16 and w3∥w4=A16, where w1, w2, w3, and w4 are the four 64-bit outputs from the mixing operation.

Each round of mixing function 400 thus has a pair of round functions 402 (with different a, b and c parameters for each round) and a pair of XOR functions 404.

Figure 5:
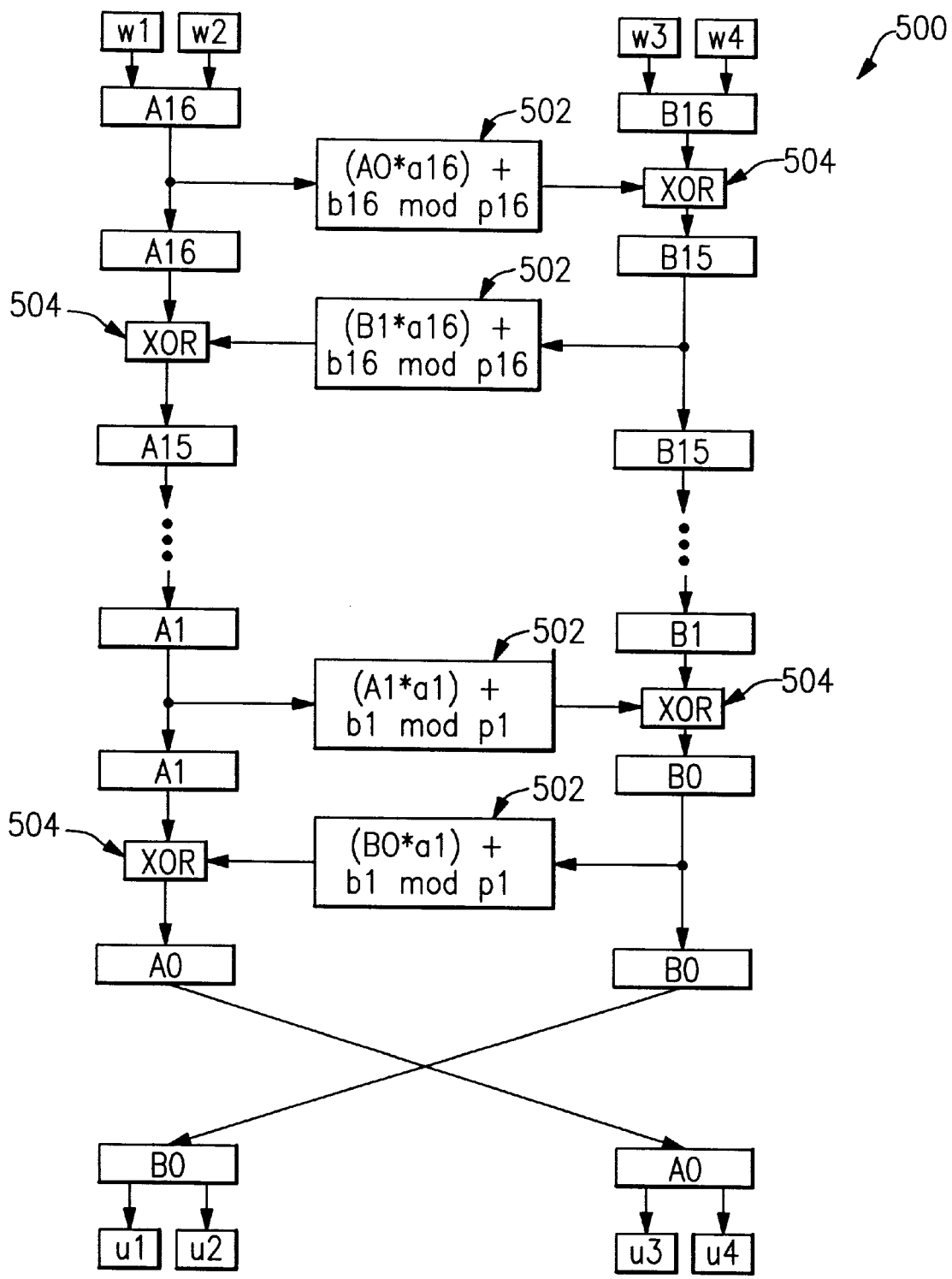
FIG. 5 is a block diagram illustration of an alternative inverse mixing function that may be used in the decryption system of FIG. 2.

FIG. 5 shows the inverse mixing function 500, which is used for the inverse mixing function 250 of the decryption system 200 if mixing function 400 is used for the mixing function 150 of the encryption system 100. Inverse mixing function 500 is identical to mixing function 400 except that the 16 sets of parameter values (a1, b1, p1), . . . , (a16, b16, p16) are used in the reverse order. Each round of inverse mixing function 500 thus has a pair of round functions 502 (with different a, b and c parameters for each round) and a pair of XOR functions 504.

The following observations can be made about the encryption/decryption system of the present invention. The encryption/decryption system divides into distinct parts, each of which solves a particular objective. The mixing function allows the construction of a long-block cipher (in this case, 256 bits) from a short-block cipher (in this case, 64 bits). It prevents an input of 0 from directly propagating into the output. In effect, the only attacks of concern stemming from the mixing function are attacks to break down the block structure, so that one can infer something about the input plaintext by observing the ciphertext (e.g., patterns in the ciphertext). Since the prime p is near $2^{128}$, any bias to 0 over 1 in the high order bit position of the (mod p) operations is very small. Further, since the mixing function is public, it has no secret keys that can be attacked via the mixing function.

The substitution functions above and below the mixing function protect the mixing function. The substitution functions make use of modular arithmetic (e.g., addition or subtraction mod $2^{64}$) operations interleaved with cryptographic operations (e.g., DES encryption or decryption) to achieve better performance.

The keys K1–K4 are exposed only in the substitution functions. Each substitution function consists of three encryptions (or decryptions) and four additions (or subtractions) mod $2^{64}$. It appears that the presence of four substitution functions on each side of the mixing function, operating in parallel and each making use of the four keys, presents no additional advantage to an attacker over a single substitution function operating on a 256-bit input. The work factor to find the keys from such a single substitution function is thought to be on the order of $2^{224}$ (the best that can be done with keys of total length 224 bits).

The present invention avoids feedbacks in the encryption operations. Insight into the problem of good design indicates that such feedbacks present an opportunity for an attacker to defeat intended security. Feedbacks also add complexity to the design and make it more difficult to access security.

Various modifications will be apparent to those skilled in the art. This, while four vertical pipes are used in the preferred embodiment, a different number may be used to achieve a desired block size. Also, while DES is used for the encryption and decryption building blocks, other encryption procedures may be used instead. Also, the operations performed in a particular substitution function may differ from the ones shown and described (e.g., a different number of encryption and modulo operations may be used), and the key scheduling and number of keys may differ as well. Similarly, the mixing functions may differ from those described above. Other variations and modifications will be apparent to those skilled in the art.

What is claimed is:

1. A method of transforming an input block into an output block using a cryptographic procedure, one of sad blocks comprising a plaintext block and the other of said blocks comprising a ciphertext block, the input block having a first block size and being partitionable into a plurality of input subblocks having a second block size, the method comprising the steps of:

passing the input subblocks through respective first substitution functions to generate a first plurality of modified subblocks, each of said first substitution functions comprising a plurality of keyed cryptographic operations performed in succession using a plurality of different keys of predetermined length for an effective key length that is greater than said predetermined length, each of said first plurality of modified subblocks corresponding to one of said input subblocks and being generated as a function of only that one of said input subblocks independently of any other of said input subblocks;

passing the first plurality of modified subblocks through a keyless mixing function to generate a second plurality of modified subblocks, each of the second plurality of modified subblocks depending on each of the first plurality of modified subblocks; and passing the second plurality of modified subblocks through respective second substitution functions to generate a plurality of output subblocks that are combinable into an output block, each of said second substitution functions comprising a plurality of keyed cryptographic operations performed in succession using a plurality of different keys of predetermined length for an effective key length that is greater than said predetermined length, each of said plurality of output subblocks corresponding to one of said second plurality of modified subblocks and being generated as a function of only that one of said second plurality of modified subblocks independently of any other of said second plurality of modified subblocks.

2. The method of claim 1 in which the input block is a plaintext block and the cryptographic procedure is an encryption procedure for transforming the plaintext block into a ciphertext block.

3. The method of claim 2 in which the ciphertext block is partitionable into a plurality of original ciphertext subblocks having the second block size, the method comprising the further steps of:

passing the original ciphertext subblocks through respective first inverse substitution functions to generate a first plurality of modified ciphertext subblocks, each of said first inverse substitution functions comprising a plurality of keyed cryptographic operations performed in succession using a plurality of different keys of predetermined length for an effective key length that is greater than said predetermined length, each of said first plurality of modified ciphertext subblocks corresponding to one of said original ciphertext subblocks and being generated as a function of only that one of said original ciphertext subblocks independently of any other of said original ciphertext subblocks;

passing the first plurality of modified subblocks through a keyless inverse mixing function to generate a second plurality of modified ciphertext subblocks, each of the second plurality of modified ciphertext subblocks depending on each of the first plurality of modified ciphertext subblocks; and passing the second plurality of modified ciphertext subblocks through respective second inverse substitution functions to generate a plurality of regenerated plaintext subblocks that are combinable into a regenerated plaintext block, each of said second inverse substitution functions comprising a plurality of keyed cryptographic operations performed in succession using a plurality of different keys predetermined length for an effective key length that is greater than said predetermined length, each of said plurality of regenerated plaintext subblocks corresponding to one of said second plurality of modified ciphertext subblocks and being generated as a function of only that one of said second plurality of modified ciphertext subblocks independently of any other of said second plurality of modified ciphertext subblocks.

4. The method of claim 1 in which the input block is a ciphertext block and the cryptographic procedure is a decryption procedure.

5. The method of claim 1 in which the mixing function comprises a plurality of rounds, each of which comprises the steps of:

generating a first intermediate value as a first round function of a first input half;

reversibly combining the first intermediate value with a second input half to generate a second output half;

generating a second intermediate value as a second round function of the second output half; and reversibly combining the second intermediate value with the first input half to generate a first output half.

6. The method of claim 5 in which the first and second round functions comprise modular addition and multiplication.

7. The method of claim 1 in which each of said substitution functions comprises a plurality of successively performed DES operation, each of said DES operations comprising DES encryption or DES decryption.

8. The method of claim 7 in which said DES operations are interleaved with modular arithmetic operations.

9. Apparatus for transforming an input block into an output block using a cryptographic procedure, one of said blocks comprising a plaintext block and the other of said blocks comprising a ciphertext block, the input block having a first block size and being partitionable into a plurality of input subblocks having a second block size, the apparatus comprising:

means for passing the input subblocks through respective first substitution functions to generate a first plurality of modified subblocks, each of said first substitution functions comprising a plurality of keyed cryptographic operations performed in succession using a plurality of different keys of predetermined length for an effective key length that is greater than said predetermined length, each of said first plurality of modified subblocks corresponding to one of said input subblocks and being generated as a function of only that one of said input subblocks independently of any other of said input subblocks;

means for passing the first plurality of modified subblocks through a keyless mixing function to generate a second plurality of modified subblocks, each of the second plurality of modified subblocks depending on each, of the first plurality of modified subblocks; and means for passing the second plurality of modified subblocks through respective second substitution functions to generate a plurality of output subblocks that are combinable into an output block, each of said second substitution functions comprising a plurality of keyed cryptographic operations performed in succession using a plurality of different keys of predetermined length for an effective key length that is greater than said predetermined length, each of said plurality of output subblocks corresponding to one of said second plurality of modified subblocks and being generated as a function of only that one of said second plurality of modified subblocks independently of any other of said second plurality of modified subblocks.

10. The apparatus of claim 9 in which the input block is a plaintext block and the cryptographic procedure is an encryption procedure for transforming the plaintext block into a cipher block, the ciphertext block being partitionable into a plurality of ciphertext subblocks having the second block size, the apparatus further comprising:

means for passing the ciphertext subblocks through respective first inverse substitution functions to generate a first plurality of modified ciphertext subblocks, each of said first inverse substitution functions comprising a plurality of keyed cryptographic operations performed in succession using a plurality of different keys of predetermined length for an effective key length that is greater than said predetermined length, each of said first plurality of modified ciphertext subblocks corresponding to one of said original ciphertext subblocks and being generated as a function of only that one of said original ciphertext subblocks independently of any other of said original ciphertext subblocks;

means for passing the first plurality of modified subblocks through a keyless inverse mixing function to generate a second plurality of modified ciphertext subblocks, each of the second plurality of modified ciphertext subblocks depending on each of the first plurality of modified ciphertext subblocks; and means for passing the second plurality of modified ciphertext subblocks through respective second inverse substitution functions to generate a plurality of regenerated plaintext subblocks that are combinable into a regenerated plaintext block, each of said second inverse substitution functions comprising a plurality of keyed cryptographic operations performed in succession using a plurality of different keys of predetermined length for an effective key length that is greater than said predetermined length, each of said plurality of regenerated plaintext subblocks corresponding to one of said second plurality of modified ciphertext subblocks and being generated as a function of only that one of said second plurality of modified ciphertext subblocks independently of any other of said second plurality of modified ciphertext subblocks.

11. The apparatus of claim 9 in which each of said substitution functions comprises a plurality of successively performed DES operations, each of said DES operations comprising DES encryption or DES decryption.

12. The apparatus of claim 11 in which said DES operations are interleaved with modular arithmetic operations.

13. A program storage device readable by a machine, tangibly embodying a program of instructions executable by the machine to perform method steps for transforming an input block using a cryptographic procedure, one of said blocks comprising a plaintext block and the other of said blocks comprising a ciphertext block, the input block having a first block size being partitionable into a plurality of input subblocks having a second block size, the method steps comprising:

passing the input subblocks through respective first substitution functions to generate a first plurality of modified subblocks, each of said first substitution functions comprising a plurality of keyed cryptographic operations performed in succession using a plurality of different keys of predetermined length for an effective key length that is greater than said predetermined length, each of said first plurality of modified subblocks corresponding to one of said input subblocks and being generated as a function of only that one of said input subblocks independently of any other of said input subblocks;

passing the first plurality of modified subblocks through a keyless mixing function to generate a second plurality of modified subblocks, each of the second plurality of modified subblocks depending on each of the first plurality of modified subblocks; and passing the second plurality of modified subblocks through respective second substitution functions to generate a plurality of output subblocks that are combinable into an output block, each of said second substitution functions comprising a plurality of keyed cryptographic operations performed in succession using a plurality of different keys of predetermined length for an effective key length that is greater than said predetermined length, each of said plurality of output subblocks correspond to one of said second plurality of modified subblocks and being generated as a function of only that one of said second plurality of modified subblocks independently of any other of said second plurality of modified subblocks.

14. The program storage device of claim 13 in which the input block is a plaintext block and the cryptographic procedure is an encryption procedure for transforming the plaintext block into a ciphertext block, the ciphertext block being partitionable into a plurality of original ciphertext subblocks having the second block size, the method steps further comprising:

passing the original ciphertext subblocks through respective first inverse substitution functions to generate a first plurality of modified ciphertext subblocks, each of said first inverse substitution functions comprising a plurality of keyed cryptographic operations performed in succession using a plurality of different keys of predetermined length for an effective key length that is greater than said predetermined length, each of said first plurality of modified ciphertext subblocks corresponding to one of said original subblocks and being generated as a function of only that one of said original ciphertext subblocks independently of any other of said original ciphertext subblocks;

passing the first plurality of modified subblocks through a keyless inverse mixing function to generate a second plurality of modified ciphertext subblocks, each of the second plurality of modified ciphertext subblocks depending on each of the first plurality of modified ciphertext subblocks; and passing the second plurality of modified ciphertext subblocks through respective second inverse substitution functions to generate a plurality of regenerated plaintext subblocks that are combinable into a regenerated plaintext block, each of said second inverse substitution functions comprising a plurality of keyed cryptographic operations performed in succession using a plurality of different keys of predetermined length for an effective key length that is greater than said predetermined length, each of said plurality of regenerated plaintext subblocks corresponding to one of said second plurality of modified ciphertext subblocks and being generated as a function of only that one of said second plurality of modified ciphertext subblocks independently of any other of said second plurality of modified ciphertext subblocks.

15. The program storage device of claim 14 in which each of said substitution functions comprises a plurality of successively performed DES operations, each of said DES operations comprising DES encryption or DES decryption.

16. The storage device of claim 15 in which said DES operations are interleaved with modular arithmetic operations.

* * * * *

UNITED STATES PATENT AND TRADEMARK OFFICE
CERTIFICATE OF CORRECTION

PATENT NO. : 6,301,362 B1
DATED : October 9, 2001
INVENTOR(S) : Matyas, Jr. et al.

It is certified that error appears in the above-identified patent and that said Letters Patent is hereby corrected as shown below:

<u>Column 10,</u>
Line 26, "original subblocks" omitted word it should be -- original ciphertext subblocks --.

Signed and Sealed this

Eleventh Day of June, 2002

Attest:

Attesting Officer

JAMES E. ROGAN
*Director of the United States Patent and Trademark Office*